(12) United States Patent
Kiyose

(10) Patent No.: US 10,514,449 B2
(45) Date of Patent: Dec. 24, 2019

(54) ULTRASONIC DEVICE, ULTRASONIC PROBE, ELECTRONIC EQUIPMENT, AND ULTRASONIC IMAGING APPARATUS

(71) Applicant: SEIKO EPSON CORPORATION, Tokyo (JP)

(72) Inventor: Kanechika Kiyose, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 414 days.

(21) Appl. No.: 15/455,545

(22) Filed: Mar. 10, 2017

(65) Prior Publication Data
US 2017/0184715 A1    Jun. 29, 2017

Related U.S. Application Data

(63) Continuation of application No. 14/164,631, filed on Jan. 27, 2014, now abandoned.

(30) Foreign Application Priority Data

Jan. 28, 2013 (JP) .................. 2013-012950

(51) Int. Cl.
| G01S 7/00 | (2006.01) |
| G01S 7/52 | (2006.01) |
| G01S 15/89 | (2006.01) |
| G10K 11/02 | (2006.01) |
| G10K 11/30 | (2006.01) |

(52) U.S. Cl.
CPC ...... *G01S 7/52079* (2013.01); *G01S 7/52053* (2013.01); *G01S 15/8925* (2013.01); *G10K 11/02* (2013.01); *G10K 11/30* (2013.01)

(58) Field of Classification Search
USPC ............................................. 367/7
See application file for complete search history.

(56) References Cited

U.S. PATENT DOCUMENTS

| 5,577,507 A | 11/1996 | Snyder et al. |
| 7,544,164 B2* | 6/2009 | Knowles ............. A61B 8/12 600/459 |
| 7,622,849 B2 | 11/2009 | Watanabe et al. |
| (Continued) | | |

FOREIGN PATENT DOCUMENTS

| JP | 59-089258 U | 6/1984 |
| JP | 01-2936851 A | 11/1989 |
| (Continued) | | |

*Primary Examiner* — James R Hulka
(74) *Attorney, Agent, or Firm* — Global IP Counselors, LLP

(57) ABSTRACT

An ultrasonic device includes a substrate having an ultrasonic element arranged on a first face of the substrate, an acoustic lens provided on a first face side of the substrate via an acoustic matching layer, and a frame having a first fixing portion and a second fixing portion. The first fixing portion and the second fixing portion being disposed between the substrate and the acoustic lens. The first fixing portion and the second fixing portion protrude toward each other in a direction generally along the first face of the substrate. The first fixing portion and the second fixing portion are separated by a perforated portion therebetween through which the acoustic matching layer penetrates. The first fixing portion and the second fixing portion are connected to the substrate and in contact with the acoustic lens.

10 Claims, 14 Drawing Sheets

(56) References Cited

U.S. PATENT DOCUMENTS

| | | |
|---|---|---|
| 8,169,855 B2 | 5/2012 | Nakamura |
| 8,758,253 B2 * | 6/2014 | Sano .................... A61B 8/4281 310/322 |
| 9,079,220 B2 | 7/2015 | Nakamura et al. |
| 9,089,872 B2 | 7/2015 | Nakamura et al. |
| 9,099,635 B2 | 8/2015 | Nakamura et al. |
| 2002/0156373 A1 | 10/2002 | Wakabayashi et al. |
| 2003/0141783 A1 | 7/2003 | Klee et al. |
| 2006/0184033 A1 * | 8/2006 | Cerofolini ................ A61B 8/00 600/459 |
| 2007/0239017 A1 | 10/2007 | Knowles et al. |
| 2010/0036257 A1 * | 2/2010 | Sano .................... A61B 8/4281 600/459 |
| 2011/0074246 A1 | 3/2011 | Nishie et al. |
| 2011/0115337 A1 | 5/2011 | Nakamura et al. |
| 2012/0188850 A1 | 7/2012 | Nakamura |
| 2013/0223191 A1 | 8/2013 | Nakamura et al. |
| 2013/0258802 A1 | 10/2013 | Nakamura et al. |
| 2013/0258803 A1 | 10/2013 | Nakamura et al. |
| 2014/0208853 A1 | 7/2014 | Onishi |
| 2014/0211587 A1 * | 7/2014 | Kiyose ................ G01S 15/8925 367/7 |
| 2016/0318068 A1 | 11/2016 | Onishi |

FOREIGN PATENT DOCUMENTS

| | | |
|---|---|---|
| JP | 02-141421 U | 11/1990 |
| JP | 06-078298 A | 3/1994 |
| JP | 07-039548 A | 2/1995 |
| JP | 2000-139916 A | 5/2000 |
| JP | 2002-271897 A | 9/2002 |
| JP | 2009-177302 A | 8/2009 |
| JP | 2012-100994 A | 5/2012 |
| JP | 2013-175879 A | 9/2013 |
| JP | 2013-208148 A | 10/2013 |
| JP | 2013-211604 A | 10/2013 |
| JP | 2014-146883 A | 8/2014 |

* cited by examiner

ULTRASONIC DEVICE, ULTRASONIC PROBE, ELECTRONIC EQUIPMENT, AND ULTRASONIC IMAGING APPARATUS

CROSS-REFERENCE TO RELATED APPLICATIONS

This application is a continuation application of U.S. patent application Ser. No. 14/164,631 filed on Jan. 27, 2014. This application claims priority to Japanese Patent Application No. 2013-012950 filed on Jan. 28, 2013. The entire disclosures of U.S. patent application Ser. No. 14/164,631 and Japanese Patent Application No. 2013-012950 are expressly incorporated by reference herein.

BACKGROUND

1. Technical Field

The present invention relates to an ultrasonic device, an ultrasonic probe, electronic equipment, and an ultrasonic imaging apparatus.

2. Related Art

Up to the present time, ultrasonic elements that transmit and receive ultrasound have been known. Ultrasonic devices using such ultrasonic elements are used for various applications.

JP-A-2012-100994, which is an example of related art, discloses an ultrasonic device used, for example, for an ultrasonic probe provided with: ultrasonic transducers (ultrasonic elements) that transmit and receive ultrasound; an acoustic lens that focuses the ultrasound; and an acoustic matching layer provided between the acoustic lens and the ultrasonic transducers.

In the ultrasonic device having such a structure, the acoustic matching layer is formed to have a specific thickness, in order to prevent the ultrasound from being reflected by an interface through which the ultrasound passes. The thickness of the acoustic matching layer is required to be adjusted with high accuracy for efficient transmission and reception of ultrasound. However, it is difficult to form the acoustic matching layer with a desired thickness in the case of forming the acoustic matching layer using a resin.

SUMMARY

Some aspects of the invention can be realized in the form of the following embodiment.

An ultrasonic device according to one embodiment includes a substrate having an ultrasonic element arranged on a first face of the substrate, an acoustic lens provided on a first face side of the substrate via an acoustic matching layer, and a frame having a first fixing portion and a second fixing portion. The first fixing portion and the second fixing portion being disposed between the substrate and the acoustic lens. The first fixing portion and the second fixing portion protrude toward each other in a direction generally along the first face of the substrate. The first fixing portion and the second fixing portion are separated by a perforated portion therebetween through which the acoustic matching layer penetrates. The first fixing portion and the second fixing portion are connected to the substrate and in contact with the acoustic lens.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
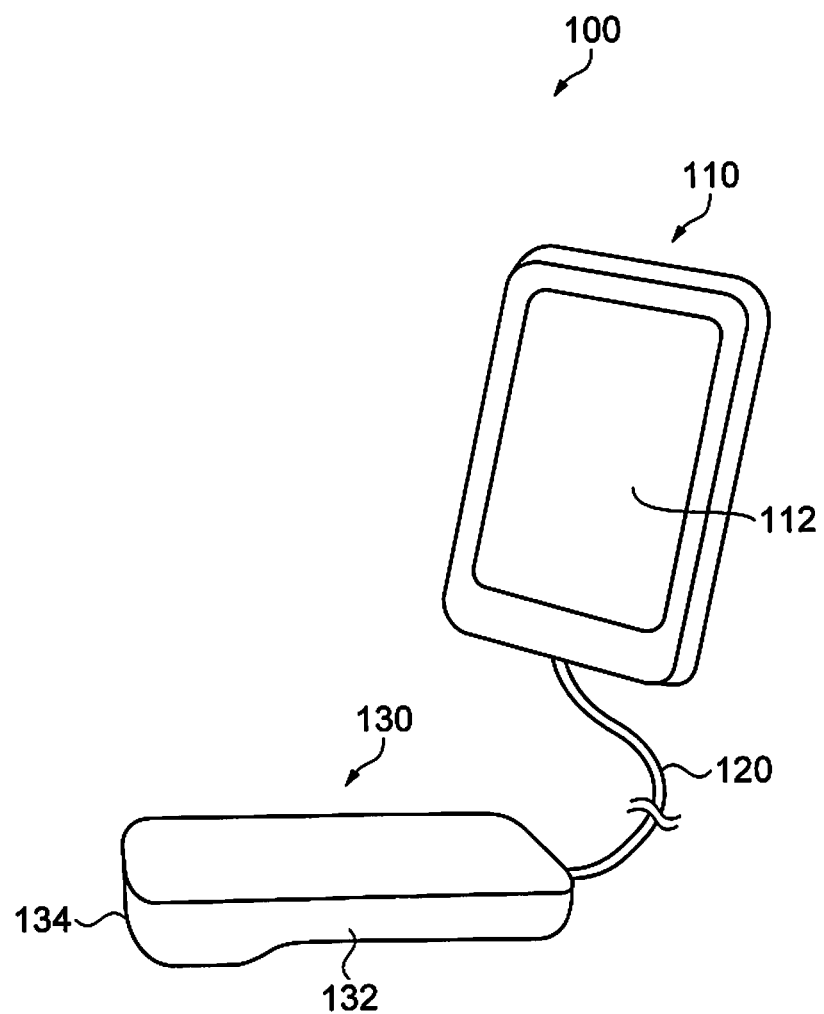
FIG. 1 is a schematic outline showing a configuration of an ultrasonic imaging apparatus of a first embodiment.

Hereinafter, embodiments for implementing the invention are described with reference to the drawings. It should be noted that, in the drawings herein referred to for the following descriptions, the dimensional ratio of each component is appropriately changed so that the component is scaled to a recognizable size.

First Embodiment

In this embodiment, an ultrasonic imaging apparatus for inspecting the inside of the human body is described as an example of electronic equipment.

(1) Overall Configuration of Ultrasonic Imaging Apparatus

Figure 2:
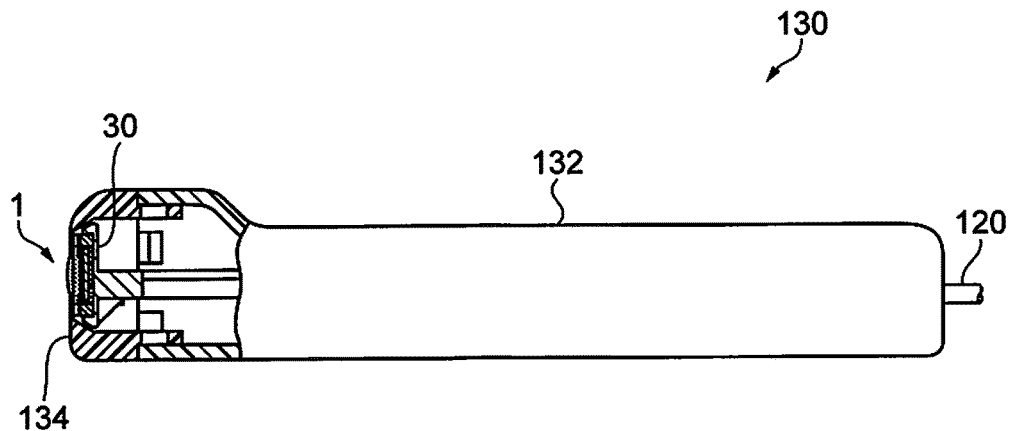
FIG. 2 is a partial sectional view of an ultrasonic probe according to the first embodiment.
Figure 3:
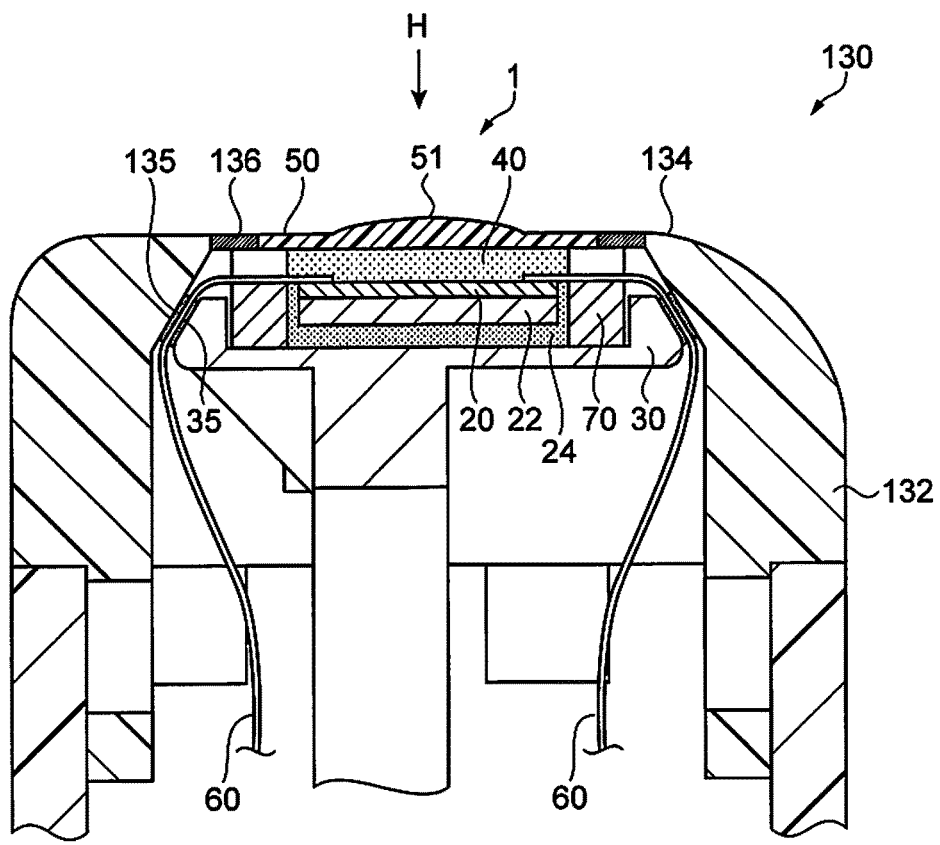
FIG. 3 is an enlarged sectional view of a head portion of the ultrasonic probe according to the first embodiment.

FIG. 1 shows a schematic outline of an ultrasonic imaging apparatus of this embodiment. FIG. 2 is a partial sectional view of an ultrasonic probe. FIG. 3 is an enlarged sectional view of a head portion of the ultrasonic probe.

As shown in FIG. 1, an ultrasonic imaging apparatus 100 includes an apparatus body 110 and an ultrasonic probe 130. The apparatus body 110 and the ultrasonic probe 130 are connected to each other by a cable 120. The apparatus body 110 and the ultrasonic probe 130 can exchange electrical signals via the cable 120.

The apparatus body 110 incorporates a display panel or the like as a display 112. In this embodiment, the display 112 is a touch panel display, and serves also as a user-interface unit (UI unit).

In the apparatus body 110, images are produced on the basis of ultrasound detected by the ultrasonic probe 130, and the thus produced images of the detection results are displayed on the screen of the display 112.

The ultrasonic probe 130 includes a housing 132 having a rectangular parallelepiped shape. The cable 120 is connected to one end in the longitudinal direction of the housing 132. On the opposite side, a head portion 134 that transmits and receives ultrasound is provided.

The ultrasonic imaging apparatus 100 of this embodiment is realized so that the apparatus body 110 and the ultrasonic probe 130 are connected by the cable 120. However, it may be realized so that the apparatus body 110 and the ultrasonic probe 130 wirelessly exchange signals without using the cable 120.

As shown in FIG. 2 and FIG. 3, in the ultrasonic probe 130, an ultrasonic device 1 fixed to a support member 30 is accommodated within the housing 132. The surface of the ultrasonic device 1 is exposed on the surface of the head portion 134 of the housing 132, so that ultrasound can be output from the surface of the head portion 134 toward a target object, and reflected waves of the ultrasound (echo waves) can be received from the object.

As shown in FIG. 3, the ultrasonic probe 130 has a gap between the ultrasonic device 1 and the head portion 134 of the housing 132. A sealing portion 136 filled with a silicone-based sealing material is provided in the gap. This sealing portion 136 prevents water, etc., from entering the ultrasonic device 1 in the housing 132 of the ultrasonic probe 130.

Further, the ultrasonic probe 130 has a sealing structure for forming a seal with the support member 30 of the ultrasonic device 1, which will be mentioned later. This sealing structure maintains pressure contact between an adhesive member 35, such as double-sided adhesive tape, which has elasticity and is attached to the peripheral portion of the support member 30 of the ultrasonic device 1, and an adhesive member 135, such as double-sided adhesive tape, which has elasticity and is attached to the housing 132.

Further, a flexible printed circuit board (hereinafter, which may be referred to also as an FPC (Flexible Printed Circuit)) 60 for connection between the ultrasonic device 1 and a processing circuit is interposed in a part of this sealing structure. In this part, the adhesive members 35 and 135 are pressed against each other with the FPC 60 being interposed therebetween.

It should be noted that a double-sided adhesive tape formed of a closed cell material, such as polyethylene and urethane, coated with an acrylic adhesive is used as the adhesive members 35 and 135.

As described above, the ultrasonic probe 130 of this embodiment employs a double sealing structure, thereby preventing water, etc., from entering the housing 132.

Figure 4:
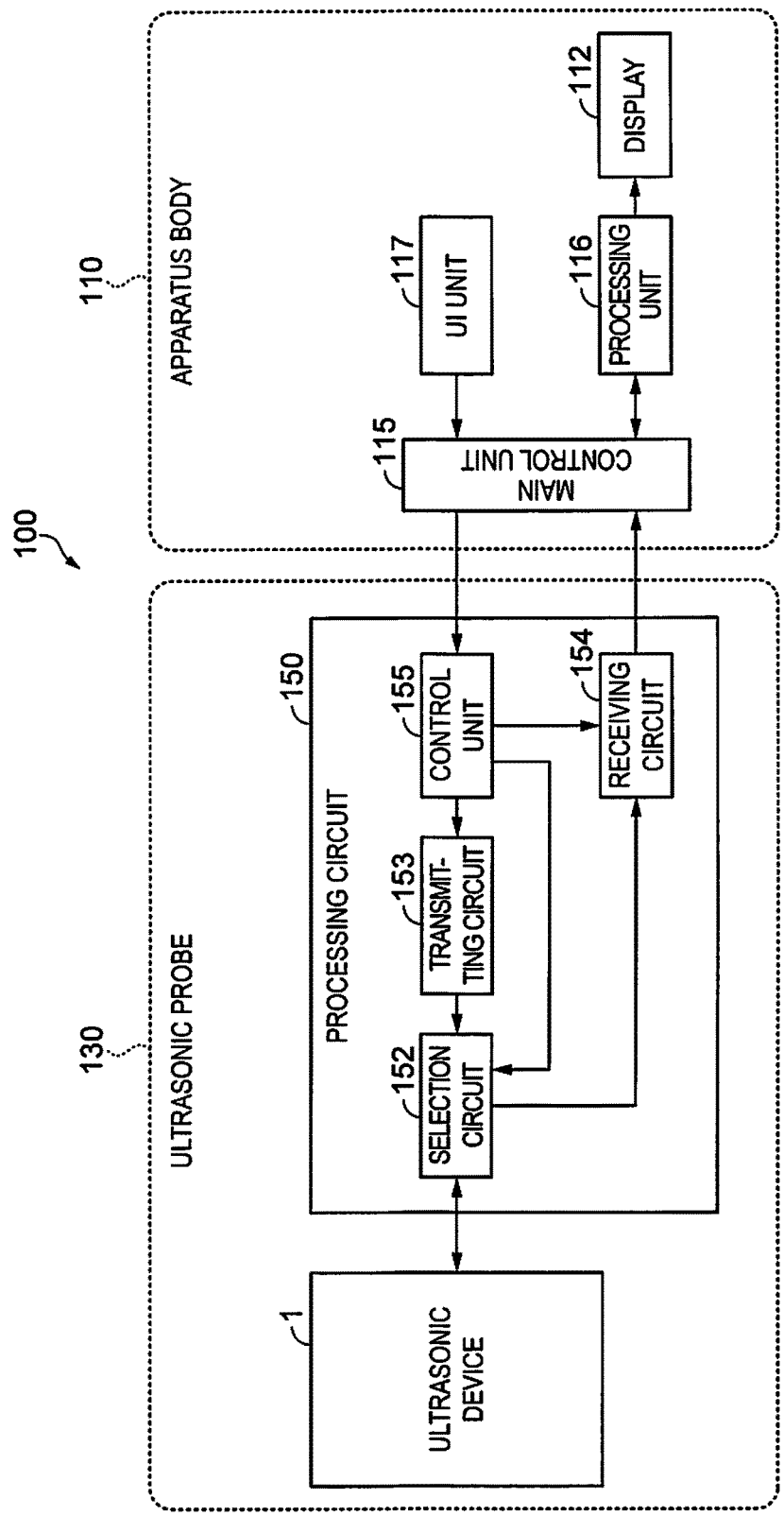
FIG. 4 is a control block diagram of an ultrasonic imaging apparatus according to the first embodiment.

FIG. 4 is a control block diagram of the ultrasonic imaging apparatus 100.

The ultrasonic imaging apparatus 100 includes the apparatus body 110 and the ultrasonic probe 130 as mentioned above.

The ultrasonic probe 130 includes the ultrasonic device 1 and a processing circuit 150.

The processing circuit 150 has a selection circuit 152, a transmitting circuit 153, a receiving circuit 154, and a control unit 155. This processing circuit 150 performs transmission processing and reception processing for the ultrasonic device 1.

The transmitting circuit 153 outputs transmission signals VT to the ultrasonic device 1 via the selection circuit 152 in a transmission period. Specifically, the transmitting circuit 153 generates the transmission signals VT, on the basis of control by the control unit 155, and outputs them to the selection circuit 152. Then, the selection circuit 152 outputs the transmission signals VT from the transmitting circuit 153, on the basis of control by the control unit 155. The frequency and amplitude voltage of the transmission signals VT can be set by the control unit 155.

The receiving circuit 154 performs reception processing on reception signals VR from the ultrasonic device 1. Specifically, the receiving circuit 154 receives the reception signals VR from the ultrasonic device 1 via the selection circuit 152 in a reception period, and performs reception processing such as amplification of the reception signals, gain setting, frequency setting, and A/D conversion (analog/digital conversion). The results of reception processing are output as detected data (detected information) to a processing unit 116 of the apparatus body 110. The receiving circuit 154, for example, can be composed of a low-noise amplifier, a voltage-controlled attenuator, a programmable gain amplifier, a low-pass filter, an A/D converter, and the like.

The control unit 155 controls the transmitting circuit 153 and the receiving circuit 154. Specifically, the control unit 155 controls the transmitting circuit 153 for generation of the transmission signals VT and the output processing, and controls the receiving circuit 154 for frequency setting of the reception signals VR, gain, or the like.

The selection circuit 152 outputs the selected transmission signals VT on the basis of control by the control unit 155.

The apparatus body 110 includes the display 112, a main control unit 115, the processing unit 116, and a UI unit (user-interface unit) 117.

The main control unit 115 controls the ultrasonic probe 130 for transmission and reception of ultrasound, and controls the processing unit 116 for image processing of detected data, or the like.

The processing unit 116 receives detected data from the receiving circuit 154, and performs necessary image processing, generation of image data to be displayed, or the like.

The UI unit 117 outputs necessary instruction (command) to the main control unit 115 on the basis of user operation (e.g., touch panel operation).

The display 112, for example, is a liquid crystal display, and displays the image data to be displayed from the processing unit 116.

It should be noted that part of control by the main control unit 115 may be performed by the control unit 155 of the processing circuit 150, or part of control by the control unit 155 may be performed by the main control unit 115.

(2) Configuration of Ultrasonic Device

Figure 5:
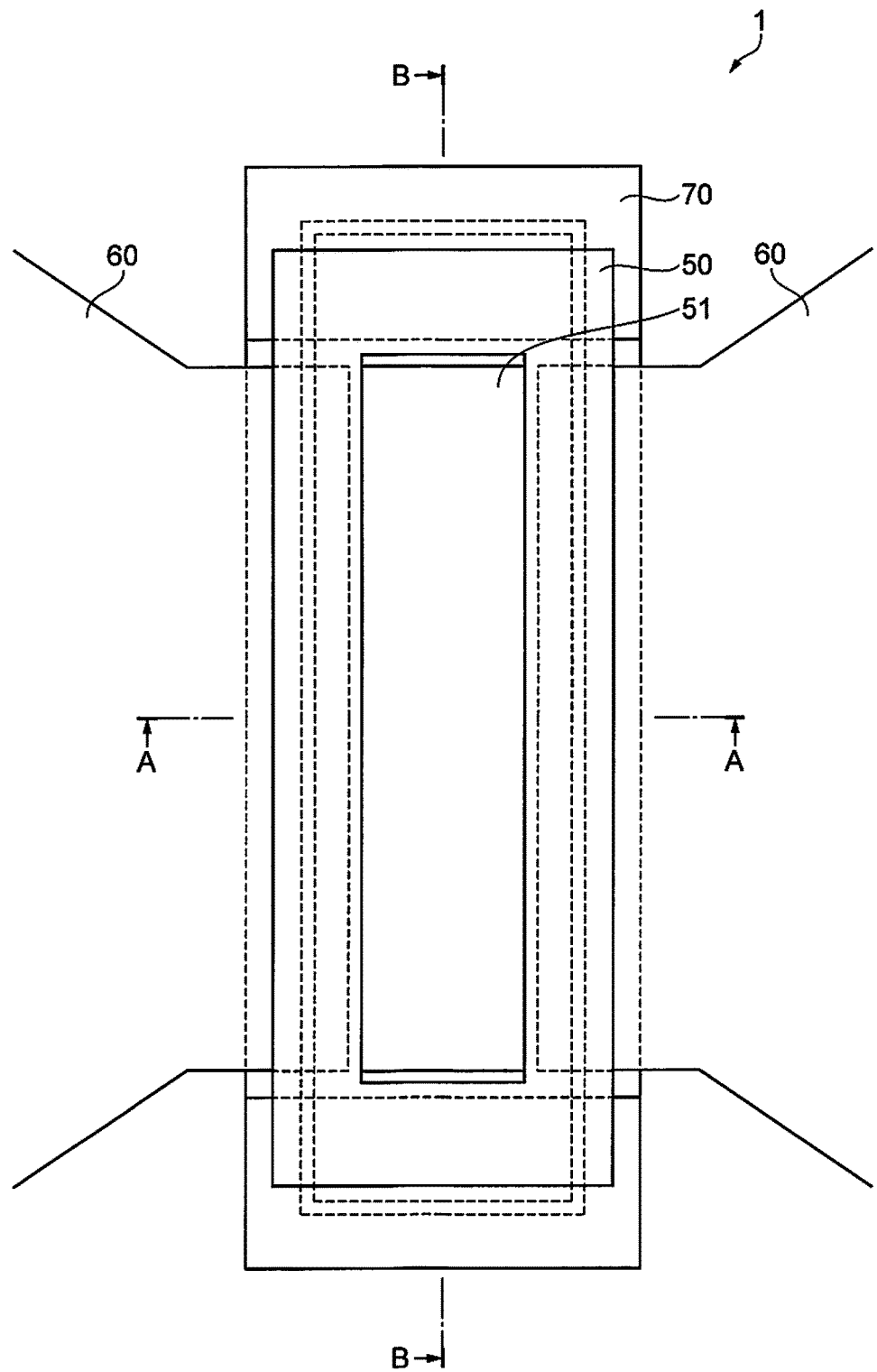
FIG. 5 is a plan view of an ultrasonic device according to the first embodiment.
Figure 6:
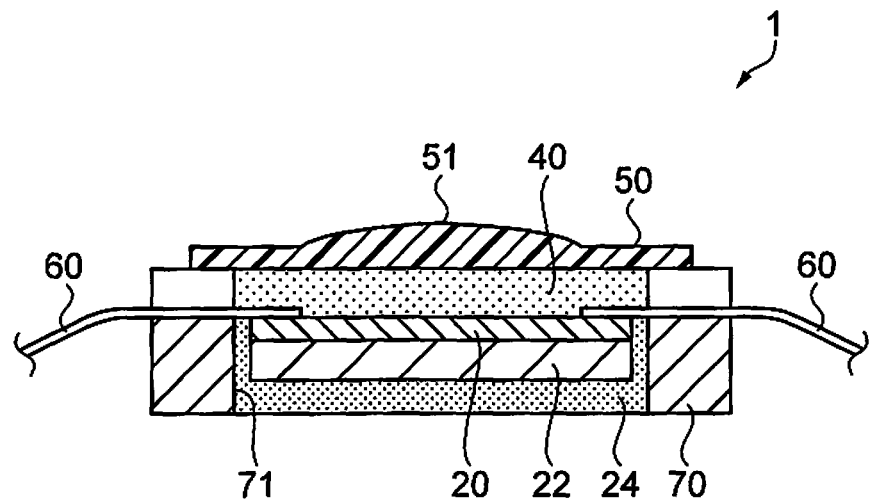
FIG. 6 is a sectional view of the ultrasonic device according to the first embodiment.
Figure 7:
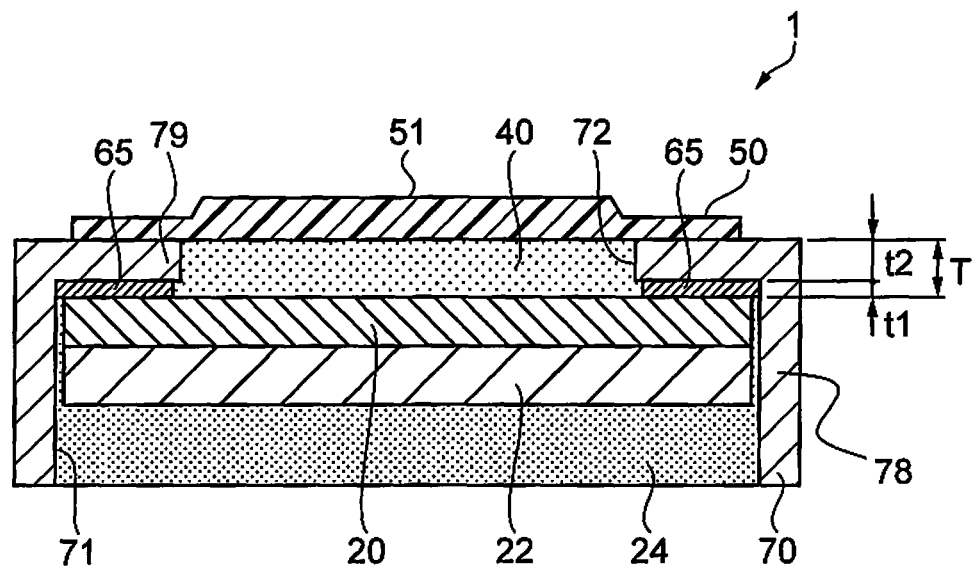
FIG. 7 is a sectional view of the ultrasonic device according to the first embodiment.
Figure 8:
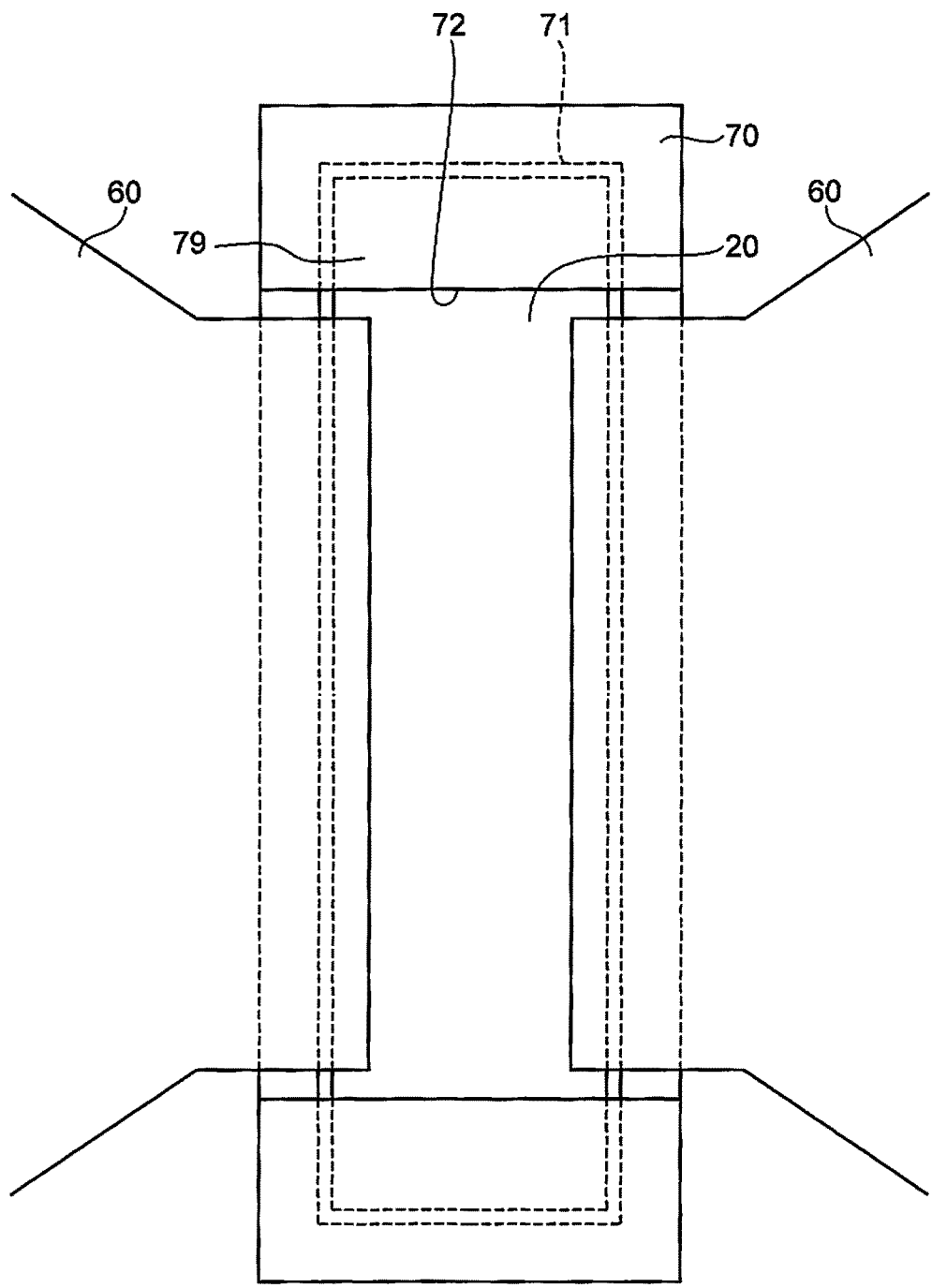
FIG. 8 is a plan view in which the acoustic lens and the acoustic matching layer are omitted from the components of the ultrasonic device according to the first embodiment.

Next, a configuration of the ultrasonic device incorporated in the ultrasonic probe is described. FIG. 5 is a plan view showing the configuration of the ultrasonic device, which corresponds to a view, as viewed in the direction of the arrow H in FIG. 3, of the ultrasonic probe. FIG. 6 is a sectional view taken along the broken line A-A of FIG. 5. FIG. 7 is a sectional view taken along the broken line B-B of FIG. 5. FIG. 8 is a plan view in which the acoustic lens and the acoustic matching layer are omitted from the components shown in FIG. 5.

As shown in FIG. 5, FIG. 6, and FIG. 7, the ultrasonic device 1 includes an ultrasonic element array substrate 20, an acoustic matching layer 40, an acoustic lens 50, and a fixing frame 70, and may further include the flexible printed circuit board (hereinafter, may be referred to also as a FPC) 60 that is connected to the ultrasonic element array substrate 20 so as to establish a connection with circuits.

The ultrasonic element array substrate 20 is a substrate on which a plurality of ultrasonic elements are arranged in an array, and has a rectangular shape in plan view. This ultrasonic element array substrate 20 is formed using a silicon substrate with a thickness of about 150 μm to 200 μm. A back plate 22, formed to have the same flat shape as the ultrasonic element array substrate 20, is bonded to a surface opposite to the element-formed surface of the ultrasonic element array substrate 20. The back plate 22 serves to suppress excessive vibration of the ultrasonic element array substrate 20, and a silicon substrate having a thickness of about 500 μm to 600 μm is used therefor. For this back plate 22, a metal plate may be used other than such a silicon substrate. Furthermore, the back plate 22 may be prepared by mixing a filler for acoustic matching and ultrasound attenuation with a resin material such as an epoxy resin. At this time, the back plate 22 preferably has a thickness of at least 5 mm.

Depending on the circumstances, the ultrasonic device 1 may be formed without using the back plate 22.

The ultrasonic element array substrate 20 will be described later in detail.

The ultrasonic element array substrate 20 fixed to the back plate 22 is fixed to the fixing frame 70 via an adhesive member 65 as shown in FIG. 7. The fixing frame 70 has fixing portions 79 (first and second fixing portions) which are disposed between the substrate 20 and the acoustic lens 50.

Figure 9A:
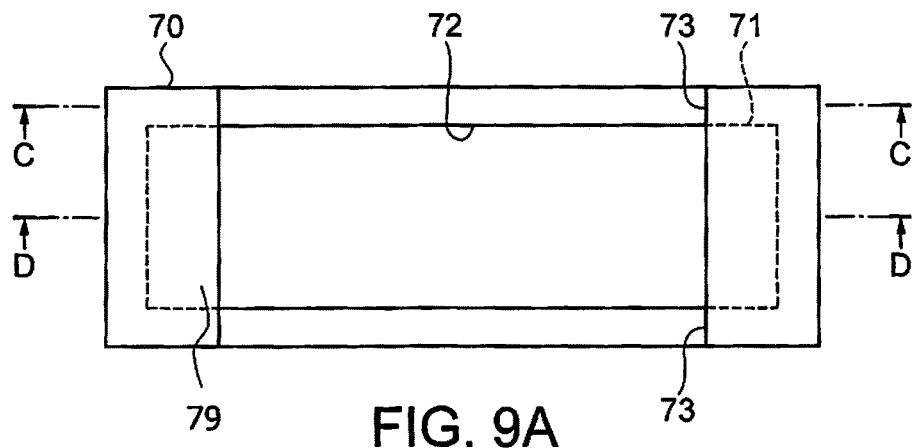
FIGS. 9A to 9D are views showing a configuration of the fixing frame of an ultrasonic element according to the first embodiment.
Figure 9B:
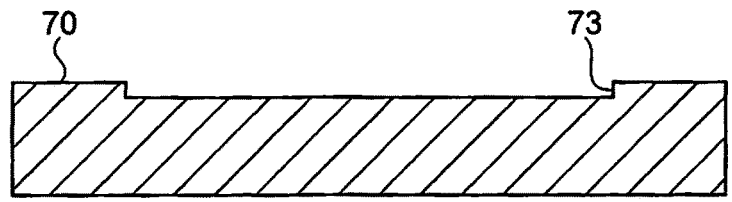
Figure 9C:
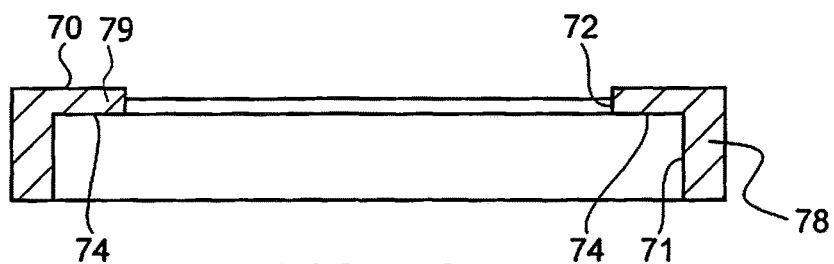
Figure 9D:
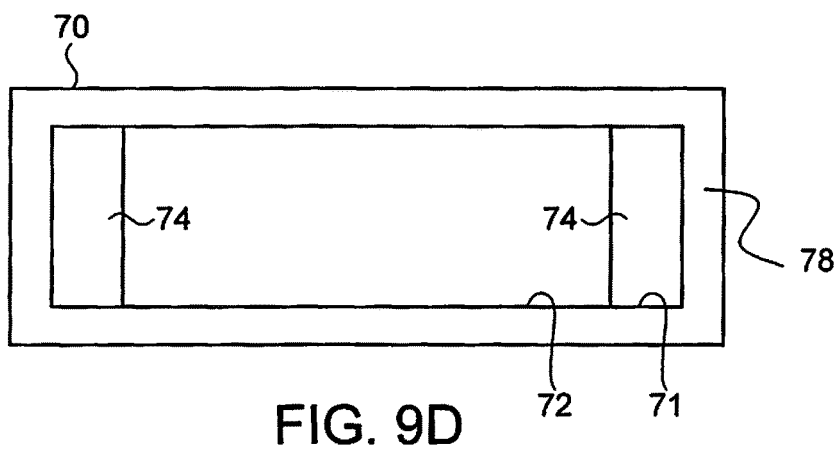

FIGS. 9A to 9D show a configuration of the fixing frame. FIG. 9A is a top plan view, FIG. 9B is a sectional view taken along the line C-C of FIG. 9A, FIG. 9C is a sectional view taken along the line D-D of FIG. 9A, and FIG. 9D is a bottom plan view.

The fixing frame 70 has a rectangular profile that is one size larger in plan view than that of the ultrasonic element array substrate 20. The fixing frame 70 has a recess 71 hollowed downward from its one surface, and the recess 71 is formed to have a size that allows a planar arrangement of the ultrasonic element array substrate 20 on a bottom face 74.

The recess 71 is preferably formed to have a size, in plan view, slightly larger than the outer dimensions of the ultrasonic element array substrate 20. In this way, the ultrasonic element array substrate 20 can be positioned within the recess 71, which facilitates assembly work of the ultrasonic device 1.

Further, the fixing frame 70 has a side portion 78 and fixing portions 79 (first and second fixing portions) protruding in a direction generally along a surface of the ultrasonic element array substrate 20 to define the recess 71. The perforated portion 72 is formed with a through hole that opens to the recess 71. The fixing portions 79 havea bottom face 74 that opposes an element-formed surface of the ultrasonic element array substrate 20. The perforated portion 72 is open with both ends, in the longitudinal direction of the fixing frame 70, of the bottom face 74 left closed. The thus left bottom face 74 of each of the fixing portions 79 serve as a fixing surface to which the ultrasonic element array substrate 20 is fixed by bonding. The ultrasonic elements of the ultrasonic element array substrate 20 can be arranged so as to be exposed through the perforated portion 72 by fixation of the element-formed surface of the ultrasonic element array substrate 20 to the bottom face 74 of the fixing portions 79.

Furthermore, an escape portion 73 hollowed downward from the top surface is formed on each of the two sides in the short direction of the top face of the fixing frame 70. The escape portion 73 is formed to facilitate mounting of the flexible printed circuit board (FPC) 60 to be connected to the ultrasonic element array substrate 20, and is hollowed downward to a dimension equivalent to the thickness of the flexible printed circuit board 60 (for example, about 120 to 150 μm).

As a material for the fixing frame 70, a metal such as stainless steel, an acrylic resin, or the like, can be used.

On the element-formed surface of the ultrasonic element array substrate 20, a plurality of terminals (not shown in the figure) connected to the plurality of ultrasonic elements are exposed, along opposite long sides in plan view. As shown in FIG. 6 and FIG. 8, these terminals are connected to the terminals of the FPC 60 (not shown in the figure), thus establishing electrical connection. For connection between the two, an anisotropic conductive adhesive, an anisotropic conductive film, or the like, is used. Electrical connection can be easily established between the terminals of the ultrasonic element array substrate 20 and the terminals of the FPC 60 by applying heat and pressure thereto.

It should be noted that the FPC 60 is used herein for connection of the terminals of the ultrasonic element array substrate 20 to an external circuit, which however is not restrictive. Other connection methods such as wire bonding may be employed therefor.

As shown in FIG. 5, FIG. 6, and FIG. 7, the acoustic lens 50 is arranged in contact with the fixing frame 70 so as to cover the perforated portion 72 on the side, formed with the perforated portion 72, of the fixing frame 70.

Figure 10A:
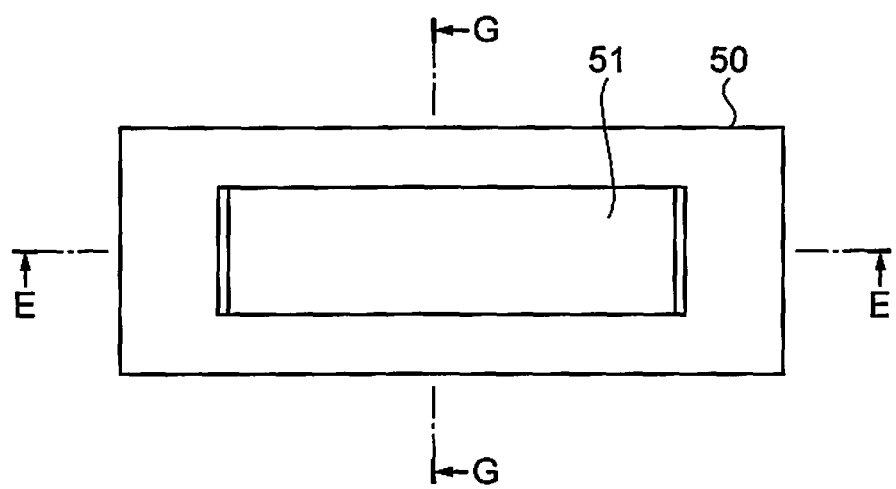
FIGS. 10A to 10C are explanatory diagrams illustrating a configuration of an acoustic lens of the ultrasonic device according to the first embodiment.
Figure 10B:
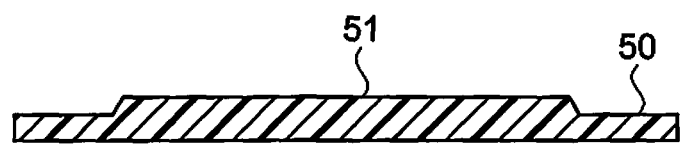
Figure 10C:
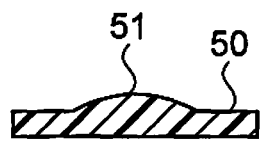

FIGS. 10A to 10C show a configuration of the acoustic lens. FIG. 10A is a plan view, FIG. 10B is a sectional view taken along the line E-E of FIG. 10A, and FIG. 10C is a sectional view taken along the line G-G of FIG. 10A.

The acoustic lens 50 has a rectangular shape in plan view, and includes a lens portion 51 at its center. The lens portion 51 is provided on one surface of the acoustic lens 50 so as to be convex with a specific curvature in the thickness direction. This lens portion 51 is provided so as to cover an area corresponding to a large number of ultrasonic elements of the ultrasonic element array substrate 20 to be described later. Further, the other surface of the acoustic lens 50 is formed to be flat.

This acoustic lens 50 serves to guide ultrasound transmitted from the ultrasonic elements of the ultrasonic element array substrate 20 efficiently to a target object, and to further guide echo waves reflected back from the object efficiently to the ultrasonic elements.

The acoustic lens 50 is formed of a resin such as a silicone resin. It is possible to adjust the acoustic impedance by changing the specific gravity of such a silicone resin through addition of silica, or the like, to the silicone resin.

As shown in FIG. 6 and FIG. 7, the acoustic matching layer 40 is formed between the ultrasonic element array substrate 20 and the acoustic lens 50. A silicone-based adhesive is used for the acoustic matching layer 40, and curing of the adhesive causes the ultrasonic element array substrate 20 and the acoustic lens 50 to be secured (bonded) to each other. The thus cured adhesive (resin) functions as an acoustic matching layer. The thickness of the acoustic matching layer 40 is set, for example, to $\frac{1}{4}\lambda$ where $\lambda$ denotes the wavelength of the ultrasound to be used. The acoustic matching layer 40 serves to relax the acoustic impedance mismatch between the acoustic lens 50 and the ultrasonic elements.

Further, the acoustic lens 50 may have a structure in which polyimide is thermally pressure bonded thereto on the side facing the ultrasonic elements for improving the moisture resistance.

Furthermore, the acoustic lens 50 may have a structure including a second acoustic matching layer provided on the side facing the ultrasonic elements.

In the ultrasonic device 1 of this embodiment, the thickness T of the acoustic matching layer 40 (dimension from the element-formed surface of the ultrasonic element array substrate 20 to the lens portion 51 of the acoustic lens 50) is determined by the sum of the thickness t1 of the adhesive member 65 and the thickness t2 of the fixing frame 70 (T=t1+t2), as shown in FIG. 7.

Thus, the thickness T of the acoustic matching layer 40 in the ultrasonic device 1 of this embodiment can be appropriately set by the contact between the fixing frame 70 and the acoustic lens 50, and thus the setting thereof is easy. Since the thickness of the acoustic matching layer 40 can be appropriately set, it is possible to transmit and receive ultrasound efficiently.

Further, the ultrasonic device 1 of this embodiment has the ultrasonic element array substrate 20 fixed to the fixing frame 70. Therefore, even when a significant impact such as dropping is applied to the ultrasonic device 1, the ultrasonic element array substrate 20 is prevented from being damaged, in which manner the impact resistance of the ultrasonic device 1 can be improved. In the ultrasonic device 1 of this embodiment, the acoustic matching layer 40 formed of a resin is arranged between the ultrasonic element array substrate 20 and the acoustic lens 50, so as to absorb impact forces from the acoustic lens 50. Thus, the impact resistance can be further improved.

It should be noted that, although an adhesive having fluidity after curing is used as the acoustic matching layer 40 in this embodiment, a sheet material also can be used for forming the acoustic matching layer. Further, although the acoustic matching layer 40 is composed of one layer in this embodiment, the acoustic matching layer 40 may be composed of multiple layers.

Furthermore, the recess 71 of the fixing frame 70 is filled with a resin 24 covering the back plate 22 secured to the ultrasonic element array substrate 20. This resin 24 serve to protect and fix the ultrasonic element array substrate 20 and the back plate 22 to the recess 71, and also to attenuate the vibration coming through the ultrasonic element array substrate 20 when used together with the back plate 22.

Any resin can be used as the resin 24, as long as the acoustic impedance matching with the back plate 22 is ensured. The material for the resin 24 is not particularly limited.

It should be noted that, in the case where the back plate 22 can suppress the vibration sufficiently to prevent unintentional transmission of the vibration, the resin 24 need not be used.

(3) Ultrasonic Elements and Ultrasonic Element Array Substrate

Next, the ultrasonic elements and the ultrasonic element array substrate of this embodiment are described by taking an ultrasonic element configured with a thin film piezoelectric element as an example.

Figure 11:
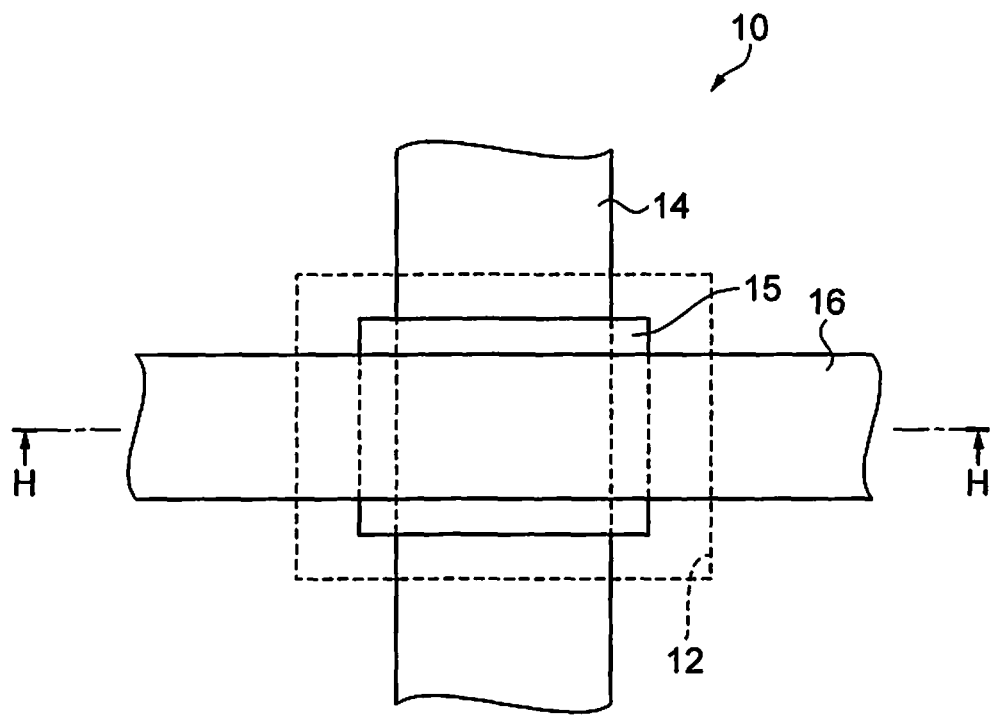
FIG. 11 is a plan view showing a schematic configuration of an ultrasonic element according to the first embodiment.
Figure 12:
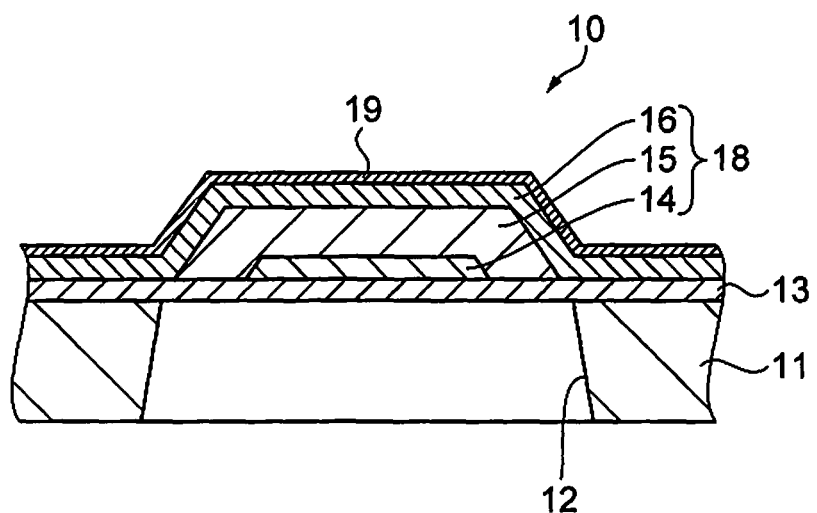
FIG. 12 is a sectional view showing the schematic configuration of the ultrasonic element according to the first embodiment.
Figure 13:
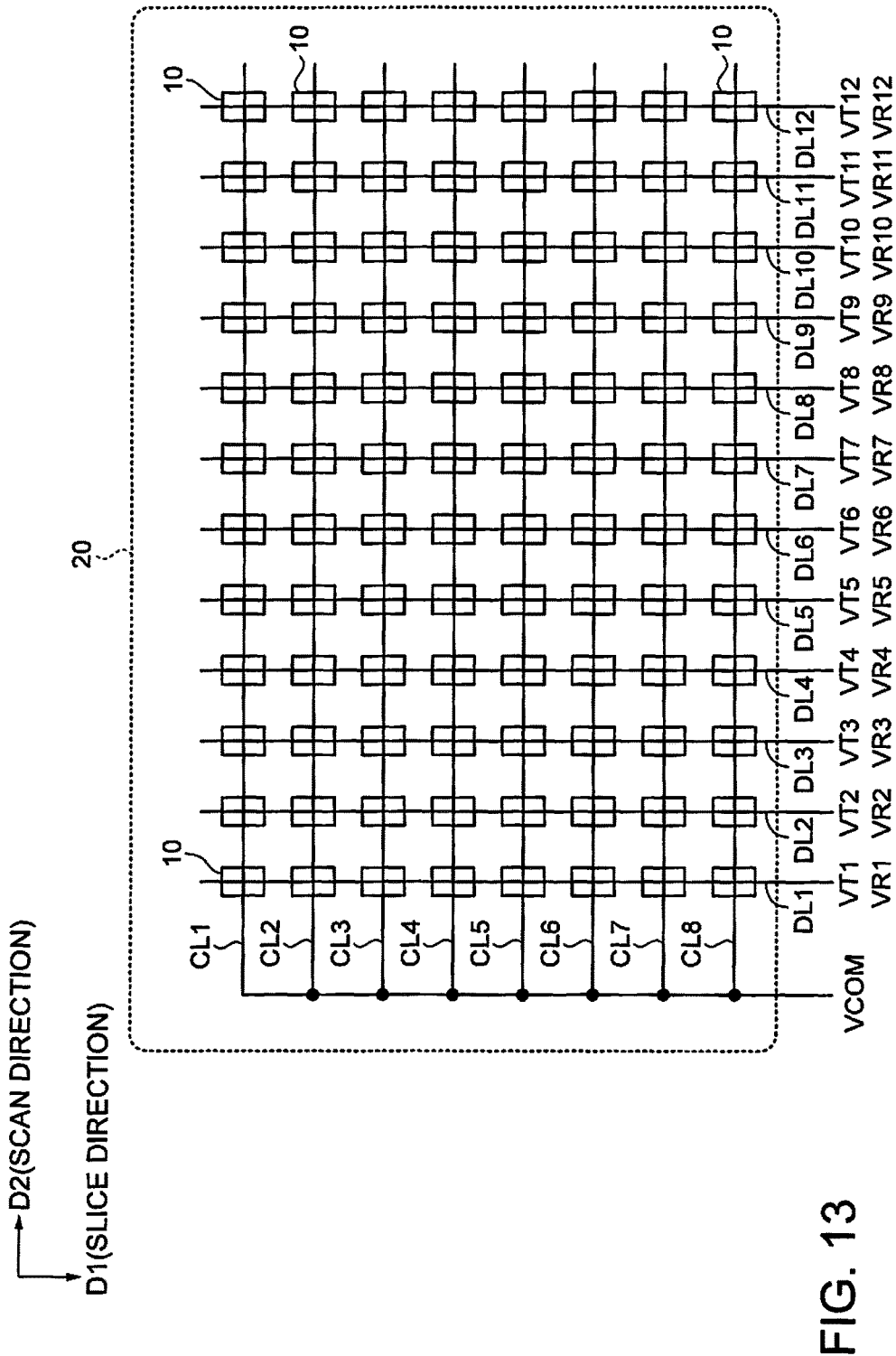
FIG. 13 is a conceptual diagram illustrating a schematic configuration of an ultrasonic element array substrate according to the first embodiment.

FIG. 11 is a schematic plan view of the ultrasonic elements of this embodiment. FIG. 12 is a schematic sectional view showing a cross section taken along the broken line H-H of FIG. 11. FIG. 13 is an explanatory diagram illustrating a schematic configuration of the ultrasonic element array substrate of this embodiment.

As shown in FIG. 11 and FIG. 12, each ultrasonic element 10 has a base substrate 11, a vibrating membrane (membrane) 13 formed on the base substrate 11, and a piezoelectric body 18 provided on the vibrating membrane 13. The piezoelectric body 18 has a first electrode 14, a piezoelectric layer 15, and a second electrode 16.

The ultrasonic element 10 has an opening 12 in the base substrate 11 such as silicon, and includes the vibrating membrane 13 that covers and closes the opening 12.

The opening 12 is formed by subjecting the back side (surface on which the elements are not to be formed) of the base substrate 11 to etching such as reactive ion etching (RIE).

The vibrating membrane 13 has a double layer structure, for example, of a $SiO_2$ layer and a $ZrO_2$ layer. In the case where the base substrate 11 is a Si substrate, the $SiO_2$ layer can be formed by subjecting the surface of the substrate to thermal oxidation treatment. Further, the $ZrO_2$ layer can be formed on the $SiO_2$ layer by a technique such as sputtering. In the case where PZT, for example, is used as the piezoelectric layer 15, which will be described later, the $ZrO_2$ layer serves to prevent Pb that constitutes the PZT from diffusing into the $SiO_2$ layer. Further, the $ZrO_2$ layer also has an effect of improving the warpage efficiency corresponding to distortion of the piezoelectric layer.

The first electrode 14 is formed on the vibrating membrane 13. The piezoelectric layer 15 is formed on the first electrode 14. The second electrode 16 is further formed on the piezoelectric layer 15.

That is, the piezoelectric body 18 has a structure in which the piezoelectric layer 15 is interposed between the first electrode 14 and the second electrode 16.

The first electrode 14 is formed of a metal thin film. In the case where a plurality of ultrasonic elements are provided, the first electrode 14 may be wired so as to be extended to the outside of the element-formed region and connected to an adjacent ultrasonic element, as shown in FIG. 11.

The piezoelectric layer 15, for example, is formed of a PZT (lead zirconate titanate) thin film, and is provided to cover at least part of the first electrode 14. It should be noted that the material for the piezoelectric layer 15 is not limited to PZT. For example, lead titanate ($PbTiO_3$), lead zirconate ($PbZrO_3$), lead lanthanum titanate ($(Pb, La)TiO_3$), or the like, may be used therefor.

The second electrode 16 is formed of a metal thin film, and is provided to cover at least part of the piezoelectric layer 15. In the case where a plurality of ultrasonic elements are provided, the second electrode 16 may be wired so as to be extended to the outside of the element-formed region and connected to an adjacent ultrasonic element, as shown in FIG. 11.

Further, as shown in FIG. 12, a moisture-proof layer 19 that covers the ultrasonic element 10 so as to prevent moisture permeation from the outside is provided. This moisture-proof layer 19 is formed of a material such as alumina, and is provided over the entire surface or a part of the ultrasonic element 10. It should be noted that the moisture-proof layer 19 may be appropriately provided depending on use conditions or environment, and a structure without including the moisture-proof layer 19 is also possible.

The piezoelectric layer 15 expands and contracts in the in-plane direction by application of a voltage to the piezoelectric layer 15, that is, between the first electrode 14 and the second electrode 16. Accordingly, upon the application of a voltage to the piezoelectric layer 15, warpage that is convex on the opening 12 side occurs, which causes the vibrating membrane 13 to warp. Upon application of an AC voltage to the piezoelectric layer 15, the vibrating membrane 13 vibrates in the film thickness direction, and this vibration of the vibrating membrane 13 causes ultrasound to be emitted from the opening 12. The voltage (drive voltage) applied to the piezoelectric layer 15, for example, is 10 to 30 V peak to peak, and the frequency thereof is 1 to 10 MHz, for example.

The ultrasonic element 10 acts also as a receiving element to receive echo waves that are generated by reflection of the emitted ultrasound on the target object and returns back thereto. The echo waves vibrate the vibrating membrane 13, during which vibration causes a stress to be applied to the piezoelectric layer 15, resulting in generation of a voltage between the first electrode 14 and the second electrode 16. This voltage can be output as a reception signal.

Next, an ultrasonic element array substrate including the aforementioned ultrasonic elements 10 arranged in an array is described below.

FIG. 13 shows a configuration of the ultrasonic element array substrate of this embodiment.

The ultrasonic element array substrate 20 includes a plurality of ultrasonic elements 10 arranged in an array, drive electrode lines DL, and common electrode lines CL.

The plurality of ultrasonic elements 10 are arranged into a matrix with m rows and n columns. In this embodiment, eight rows along a first direction D1 and twelve columns along a second direction D2 intersecting the first direction D1 are arranged.

The drive electrode lines DL1 to DL12 are each formed along the first direction D1.

During the transmission period in which ultrasound is emitted, the transmission signals VT1 to VT12 output by the aforementioned processing circuit 150 are supplied to the respective ultrasonic elements 10 via the drive electrode lines DL1 to DL12. Meanwhile, during the reception period in which ultrasonic echo signals are received, the reception signals VR1 to VR12 from the ultrasonic elements 10 are output to the processing circuit 150 via the drive electrode lines DL1 to DL12.

Common electrode lines CL1 to CL8 are each formed along the second direction D2.

The common electrode lines CL1 to CL8 are supplied with a common voltage VCOM. This common voltage only needs to be a constant direct current voltage, and is not necessarily 0 V, namely, a ground potential.

It should be noted that the arrangement of the ultrasonic elements 10 is not limited to the matrix arrangement with m rows and n columns shown in FIG. 13.

In the transmission period, a voltage that is the difference between the transmission signal voltage and the common voltage is applied to each of the ultrasonic elements 10, and ultrasound is emitted at a specific frequency.

As described above, the ultrasonic imaging apparatus 100 and the ultrasonic probe 130 of this embodiment include the ultrasonic device 1 that can set an appropriate thickness of the acoustic matching layer and efficient transmission and reception of ultrasound, which allows the ultrasonic imaging apparatus 100 and the ultrasonic probe 130 with high accuracy to be provided.

Modifications of the First Embodiment

Next, modifications of the ultrasonic device of the first embodiment are described.

Figure 14:
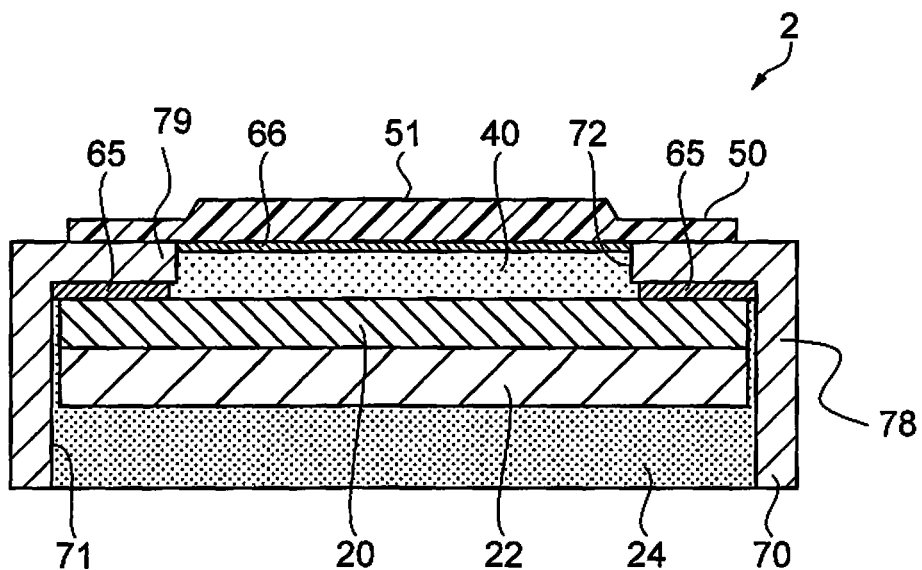
FIG. 14 is a sectional view showing a modification of the ultrasonic device according to the first embodiment.
Figure 15:
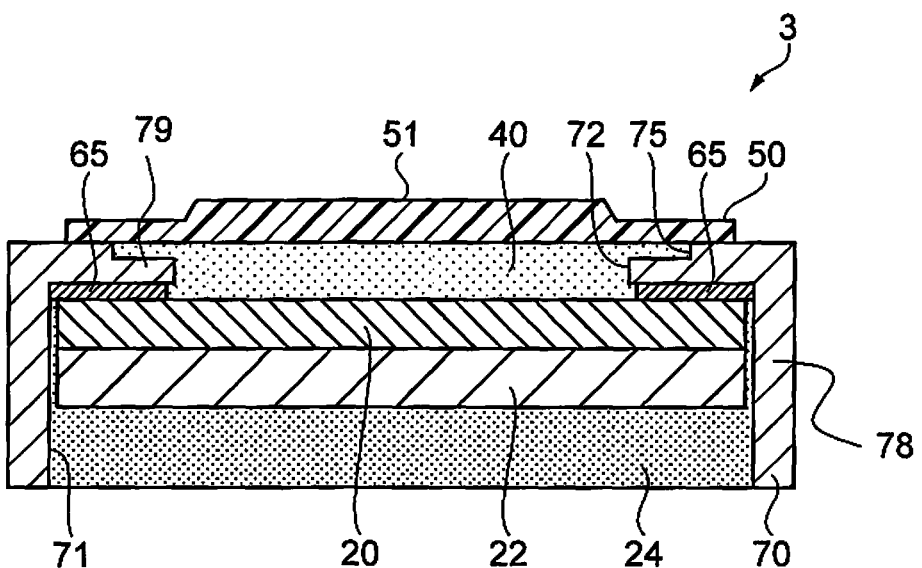
FIG. 15 is a sectional view showing a modification of the ultrasonic device according to the first embodiment.

FIG. 14 and FIG. 15 are each a sectional view showing a configuration of a modification of the ultrasonic device. In these modifications, the same components as in the first embodiment are denoted by the same reference numerals, and the description thereof is omitted.

An ultrasonic device 2 shown in FIG. 14 has a moisture-proof layer 66 between the acoustic matching layer 40 and the acoustic lens 50.

The moisture-proof layer 66 can prevent moisture permeating from the outside from reaching the ultrasonic element array substrate 20, so as to enhance the reliability of the ultrasonic device 2.

As a material for the moisture-proof layer 66, a film material such as polyphenylene sulfide (PPS) is used. However, the material for the moisture-proof layer 66 is not limited to this.

An ultrasonic device 3 shown in FIG. 15 is provided with a step 75 in a portion, facing the acoustic lens 50, of the fixing frame 70. The step 75 is formed by hollowing out a part of the contact portion between the fixing frame and the acoustic lens shown in FIG. 7 of the first embodiment.

In the case where an adhesive having fluidity is used as the acoustic matching layer 40, the adhesive before curing may possibly overflow. Then, this step 75 can absorb the overflow of the adhesive. Further, in the case where air bubbles are contained in the adhesive, the step 75 provides an escape for the air bubbles, thereby separating the air bubbles from the effective portion of the acoustic matching layer 40.

Second Embodiment

Next, an ultrasonic device of the second embodiment is described.

Figure 16:
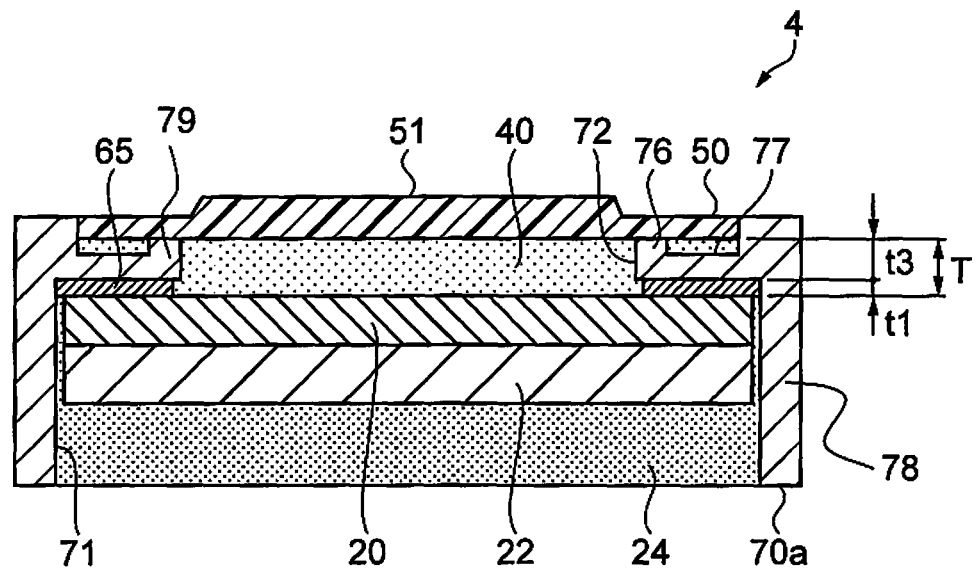
FIG. 16 is a sectional view showing the ultrasonic device according to a second embodiment.
Figure 17:
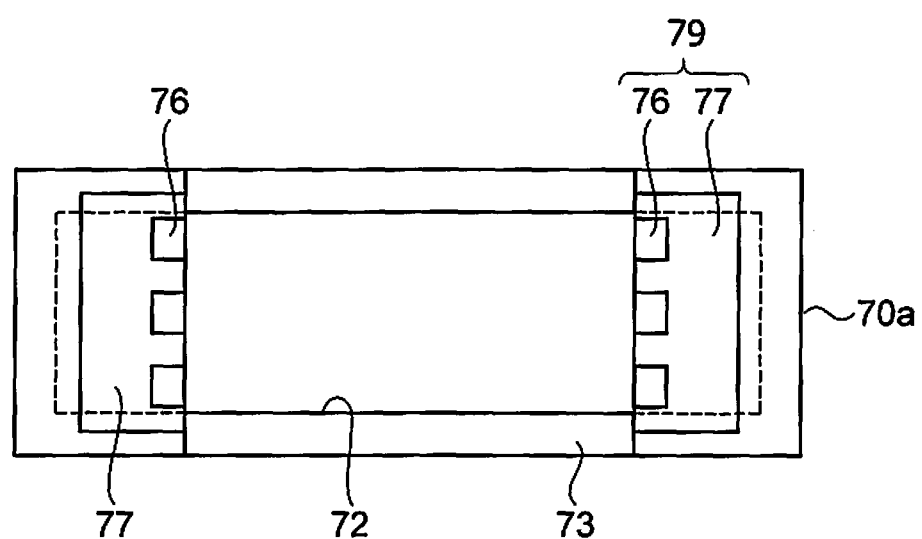
FIG. 17 is a plan view showing the fixing frame according to the second embodiment.

FIG. 16 is a sectional view showing a configuration of the ultrasonic device of this embodiment. FIG. 17 is a plan view showing a configuration of a fixing frame, as viewed from the back surface (surface in contact with the ultrasonic element array substrate).

This embodiment has the same configuration as the first embodiment, except that the fixing frame has a different structure from the first embodiment. Therefore, the same components as in the first embodiment are denoted by the same reference numerals, and the description thereof is omitted.

An ultrasonic device 4 shown in FIG. 16 is provided with a plurality of first projections 76 in portions, which come into contact with the acoustic lens 50, of the fixing frame 70a. The first projections 76 are provided on each of both sides in the longitudinal direction of the fixing frame 70a, as shown in FIG. 17. The first projections 76 are formed at positions slightly lower than the top surface of the fixing frame 70a, and a step 77 is further formed by hollowing out the periphery of the first projections 76 downward from the first projections 76. The step 77 is provided to have a shape such that the acoustic lens 50 is fitted thereinto so as to be positioned.

In this way, the acoustic lens 50 comes into contact with the first projections 76 of the fixing frame 70a, so that the acoustic lens 50 is fixed to the fixing frame 70a.

In the ultrasonic device 4 of this embodiment, the thickness T of the acoustic matching layer 40 (dimension from the element-formed surface of the ultrasonic element array substrate 20 to the lens portion 51 of the acoustic lens 50) is determined by the sum of the thickness t1 of the adhesive member 65 and the thickness t3 of the fixing frame (thickness of the fixing frame including the first projections 76) (T=t1+t3), as shown in FIG. 16.

Thus, the thickness T of the acoustic matching layer 40 in the ultrasonic device 4 of this embodiment can be appropriately set by the contact between the fixing frame 70a and the acoustic lens 50, and thus the setting thereof is easy. Since the thickness of the acoustic matching layer 40 can be appropriately set, it is possible to transmit and receive ultrasound efficiently.

Further, the acoustic lens 50 is received by the first projections 76, which enables the acoustic lens 50 to be fixed to the fixing frame 70a with good accuracy without inclination on the fixed surface.

Furthermore, the step 77 is formed in the periphery of the first projections 76 of the fixing frame 70a. Thus, when an adhesive having fluidity is used as the acoustic matching layer 40, the step 77 can absorb the overflow of the adhesive. Further, in the case where air bubbles are contained in the adhesive agent, the step 77 provides an escape for the air bubbles, thereby separating the air bubbles from the effective portion of the acoustic matching layer 40.

Third Embodiment

Next, an ultrasonic device of the third embodiment is described.

Figure 18:
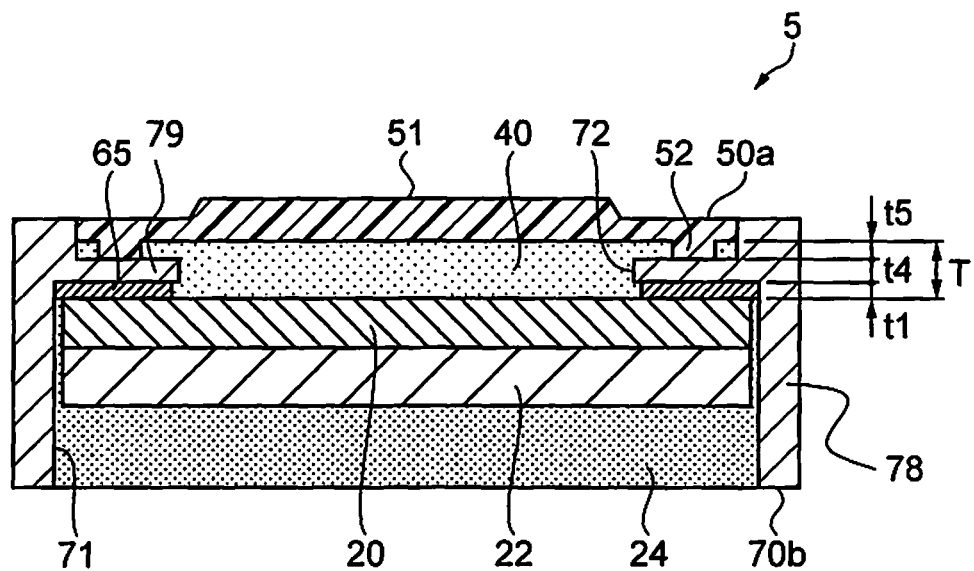
FIG. 18 is a sectional view showing a configuration of an ultrasonic device according to a third embodiment.
Figure 19:
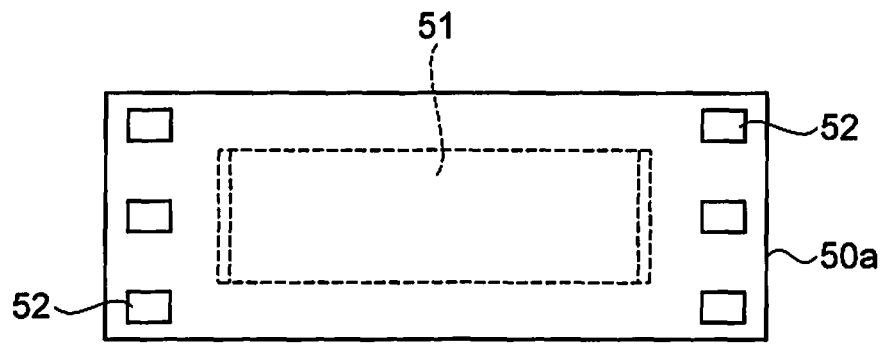
FIG. 19 is a plan view of the acoustic lens according to the third embodiment.

FIG. 18 is a sectional view showing a configuration of the ultrasonic device of this embodiment. FIG. 19 is a plan view showing a configuration of an acoustic lens.

This embodiment has the same configuration as the first embodiment, except that the acoustic lens and the fixing frame each have a different structure from the first embodiment. Therefore, the same components as in the first embodiment are denoted by the same reference numerals, and the description thereof is omitted.

An ultrasonic device 5 shown in FIG. 18 is provided with a plurality of second projections 52 (first and second projections of the acoustic lens) in portions of the acoustic lens 50a that come into contact with the fixing frame 70b. The second projections 52 are provided on each of both sides in the longitudinal direction of the acoustic lens 50a, as shown in FIG. 19.

The portions of the fixing frame 70b that come into contact with the second projections 52 are formed at positions slightly lower than the top surface of the fixing frame 70b. The fixing frame 70b is formed to have the top surface hollowed downward so that the acoustic lens 50a is fitted into the fixing frame 70b so as to be positioned.

In this way, the second projections 52 of the acoustic lens 50a come into contact with the fixing frame 70b, so that the acoustic lens 50a is fixed to the fixing frame 70b.

In the ultrasonic device 5 of this embodiment, the thickness T of the acoustic matching layer 40 (dimension from the element-formed surface of the ultrasonic element array substrate 20 to the lens portion 51 of the acoustic lens 50a) is determined by the sum of the thickness t1 of the adhesive member 65, the thickness t4 of the fixing frame, and the thickness t5 of the second projections of the acoustic lens 50a (T=t1+t4+t5), as shown in FIG. 18.

Thus, the thickness T of the acoustic matching layer 40 in the ultrasonic device 5 of this embodiment can be appropriately set by the contact between the fixing frame 70b and the acoustic lens 50a, and thus the setting thereof is easy. Since the thickness of the acoustic matching layer 40 can be appropriately set, it is possible to transmit and receive ultrasound efficiently.

Further, the fixing frame 70b is received by the second projections 52, which enables the acoustic lens 50a to be fixed to the fixing frame 70b with good accuracy without disadvantages such as inclination on the fixed surface.

Figure 20:
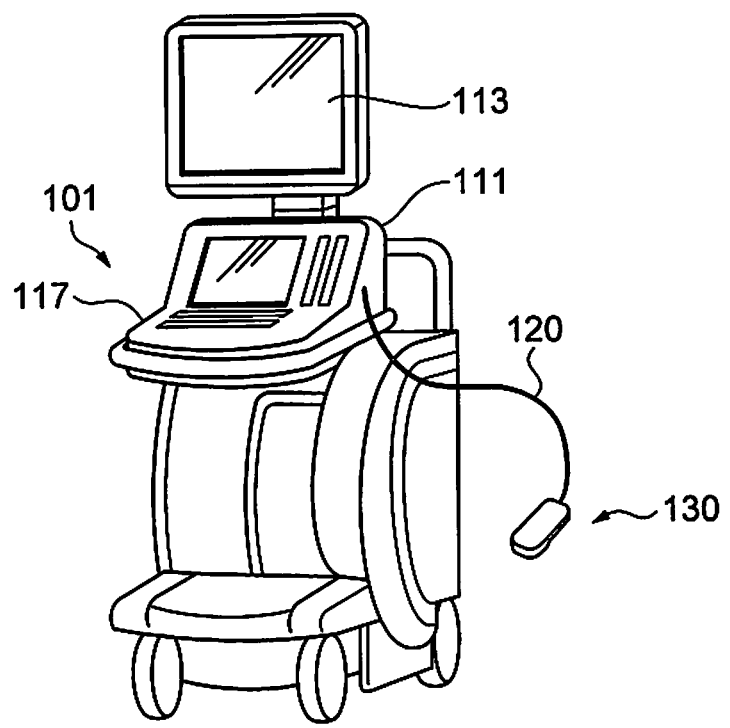
FIG. 20 is a schematic outline showing a configuration of another ultrasonic imaging apparatus.

Next, though a portable ultrasonic imaging apparatus is exemplified in the above-mentioned embodiment, FIG. 20 shows a specific configuration example of an ultrasonic imaging apparatus of another embodiment.

An ultrasonic imaging apparatus 101 is a stationary ultrasonic imaging apparatus, and includes the ultrasonic probe 130.

The ultrasonic imaging apparatus 101 has an apparatus body (electronic equipment body) 111, a display 113 that displays image data to be displayed, a user-interface unit (UI unit) 117, the ultrasonic probe 130, and the cable 120.

Effects of the invention can be exerted by employing such a stationary ultrasonic imaging apparatus.

Further, the ultrasonic imaging apparatus of this embodiment can be used for in-vivo measurements of fat thickness, muscle thickness, bloodstream, bone density, etc.

The invention is not limited to the foregoing embodiments. The specific arrangements and procedures in practicing the invention may be altered by another arrangement or the like, as necessary, as long as the advantages of the invention can be achieved. Many modifications can be made by a person of ordinary skill in the art without departing from the technical scope of the invention.

As explained above, an ultrasonic device according to one embodiment includes: an ultrasonic element array substrate having a plurality of ultrasonic elements that each include a piezoelectric body and perform at least one of transmission and reception of ultrasound; a fixing frame having a recess to which the ultrasonic element array substrate is fixed, and a perforated portion formed with a through hole by opening a part of the bottom face of the recess, wherein an element-formed surface of the ultrasonic element array substrate faces the perforated portion; an acoustic lens secured to the fixing frame so as to cover the perforated portion of the fixing frame, the acoustic lens having a lens portion that focuses the ultrasound; and an acoustic matching layer arranged between the ultrasonic element array substrate and the acoustic lens, the acoustic matching layer being formed of a resin that secures the ultrasonic element array substrate and the acoustic lens to each other. The acoustic lens and the fixing frame are in contact with each other, and the thickness of the acoustic matching layer is maintained at a fixed value.

According to this configuration, the element-formed surface of the ultrasonic element array substrate is fixed to the fixing frame within the recess so as to be exposed through the perforated portion. Then, the acoustic lens comes into contact with the fixing frame so as to be secured thereto, while covering the perforated portion of the fixing frame.

Therefore, it is possible to specify the distance between the surface of the ultrasonic element array substrate and the lens portion of the acoustic lens, so as to maintain the thickness of the acoustic matching layer formed between the ultrasonic element array substrate and the acoustic lens at a fixed value. Since the acoustic matching layer can be formed to have a thickness with good accuracy, it is possible to transmit and receive ultrasound efficiently.

In the ultrasonic device according to the above-mentioned embodiment, the acoustic matching layer is preferably a resin filled between the ultrasonic element array substrate and the acoustic lens, so as to be secured to the ultrasonic element array substrate and the acoustic lens.

According to this configuration, the acoustic matching layer is composed of a resin, and the ultrasonic element array substrate and the acoustic lens can be secured to each other with a resin (adhesive).

Therefore, the cured resin (adhesive) allows the ultrasonic element array substrate and the acoustic lens to be bonded to each other, and can function also as an acoustic matching layer.

In the ultrasonic device according to the above-mentioned embodiment, it is preferable that a first projection is formed in a part of the fixing frame, and the distance between the ultrasonic element array substrate and the acoustic lens is specified by contact of the first projection with the acoustic lens.

According to this configuration, the first projection is formed in a part of the fixing frame that is contact with the acoustic lens.

Therefore, the acoustic lens is received by the first projection, which enables the acoustic lens to be fixed to the fixing frame with good accuracy without disadvantages such as inclination on the fixed surface.

In the ultrasonic device according to the above-mentioned embodiment, it is preferable that a second projection is formed in a part of the acoustic lens, and the distance between the ultrasonic element array substrate and the acoustic lens is specified by contact of the second projection with the fixing frame.

According to this configuration, the second projection is formed in a part of the acoustic lens that is in contact with the fixing frame.

Therefore, the fixing frame is received by the second projection, which enables the acoustic lens to be fixed to the fixing frame with good accuracy without disadvantages such as inclination on the fixed surface.

In the ultrasonic device according to the above-mentioned embodiment, it is preferable that a back plate is fixed to a surface opposite to the element-formed surface of the ultrasonic element array substrate, and that a resin is filled in the recess of the fixing frame so as to cover the back plate.

According to this configuration, the back plate is fixed to the surface opposite to the element-formed surface of the ultrasonic element array substrate, and the resin is filled in the recess of the fixing frame.

Therefore, it is possible to fix the ultrasonic element array substrate and the back plate securely to the inside of the fixing frame.

In the ultrasonic device according to the above-mentioned embodiment, it is preferable that the ultrasonic element array substrate include: a base substrate provided with a plurality of openings arranged in an array; a vibrating membrane formed to cover the openings, the vibrating membrane being displaceable in a film thickness direction; and a piezoelectric body provided on the vibrating membrane. It is also preferable that the piezoelectric body includes a first electrode provided on the vibrating membrane; a piezoelectric layer provided to cover at least part of the first electrode; and a second electrode provided to cover at least part of the piezoelectric layer.

According to this configuration, the ultrasonic element array substrate includes the base substrate provided with the plurality of openings arranged in an array; the vibrating membrane formed to cover the openings, the vibrating membrane being displaceable in the film thickness direction; and the piezoelectric body provided on the vibrating membrane, the piezoelectric body being formed by layering the first electrode, the piezoelectric layer, and the second electrode on the vibrating membrane.

In the ultrasonic device having such a configuration, the ultrasonic element array substrate can be downsized, leading to a reduction in size of the ultrasonic device.

An ultrasonic probe according to this embodiment includes: the ultrasonic device described in any one of the above embodiments; and a housing supporting the ultrasonic device.

According to this configuration, the ultrasonic device described above and the housing supporting the ultrasonic device are provided.

The ultrasonic probe of this embodiment includes the ultrasonic device that can set an appropriate thickness of the acoustic matching layer and performs efficient transmission and reception of ultrasound. Thus, it is possible to provide an ultrasonic probe with high accuracy.

Electronic equipment according to this embodiment includes: the ultrasonic device described above; and a processing circuit that is connected to the ultrasonic device and processes an output of the ultrasonic device.

According to this configuration, the ultrasonic device described above and the processing circuit that processes the output of the ultrasonic device are provided.

The electronic equipment of this embodiment includes the ultrasonic device that can set an appropriate thickness of the acoustic matching layer and performs efficient transmission and reception of ultrasound. Thus, it is possible to provide electronic equipment with high accuracy.

An ultrasonic imaging apparatus according to this embodiment includes: the ultrasonic device described above; a processing circuit that is connected to the ultrasonic device and processes an output of the ultrasonic device so as to generate an image; and a display that displays the image.

According to this configuration, the ultrasonic device described above, the processing circuit that processes an output of the ultrasonic device so as to generate an image, and the display that displays the image are provided.

The ultrasonic imaging apparatus of this embodiment includes the ultrasonic device that can set an appropriate thickness of the acoustic matching layer and performs efficient transmission and reception of ultrasound. Thus, it is possible to provide an ultrasonic imaging apparatus with high accuracy.

What is claimed is:

1. An ultrasonic device comprising:
a substrate having an ultrasonic element arranged on a first face of the substrate;
an acoustic lens provided on a first face side of the substrate via an acoustic matching layer; and
a frame having a first fixing portion and a second fixing portion, the first fixing portion and the second fixing portion being disposed between the substrate and the acoustic lens, the first fixing portion and the second fixing portion protruding toward each other in a direction generally along the first face of the substrate to cover part of the first face of the substrate on both ends, the first fixing portion and the second fixing portion being separated by a perforated portion therebetween through which the acoustic matching layer penetrates, the first fixing portion and the second fixing portion having a first face and a second face opposite from the first face to face the first face of the substrate, the first fixing portion and the second fixing portion being connected to the substrate and in contact with the acoustic lens on the first face of the first fixing portion and the second fixing portion.

2. The ultrasonic device according to claim 1, wherein the acoustic matching layer is formed of a resin that is secured to the substrate and the acoustic lens.

3. The ultrasonic device according to claim 1, wherein the acoustic lens has a first projection that is in contact with the first fixing portion and a second projection that is in contact with the second fixing portion.

4. The ultrasonic device according to claim 3, wherein the first projection and the second projection are provided on a peripheral portion of the acoustic lens when viewed along the thickness direction of the substrate in a plan view.

5. The ultrasonic device according to claim 1, further comprising
a support member provided on a second face of the substrate opposite from the first face, and
a flexible printed circuit board electrically connected to the first face of the substrate,
part of the flexible printed circuit board being secured to the support member.

6. The ultrasonic device according to claim 5, wherein
an inclined face is provided on part of an outer edge of the support member, and
the flexible printed circuit board is secured to the inclined face of the support member.

7. The ultrasonic device according to claim 1, wherein the substrate includes:
a base substrate provided with an opening;
a vibrating membrane formed to cover the opening, the vibrating membrane being displaceable in a film thickness direction; and
a piezoelectric body provided on the vibrating membrane, the piezoelectric body including:
a first electrode provided on the vibrating membrane;
a piezoelectric layer provided to cover at least part of the first electrode; and
a second electrode provided to cover at least part of the piezoelectric layer.

8. An ultrasonic probe comprising:
the ultrasonic device according to claim 1; and
a housing supporting the ultrasonic device.

9. Electronic equipment comprising:
the ultrasonic device according to claim 1; and
a processing circuit that is connected to the ultrasonic device and processes an output of the ultrasonic device.

10. An ultrasonic imaging apparatus comprising:
the ultrasonic device according to claim 1;
a processing circuit that is connected to the ultrasonic device and processes an output of the ultrasonic device so as to generate an image; and
a display that displays the image.

* * * * *